Aug. 17, 1965    W. V. BERRY    3,201,104
OXYGEN LANCE FOR SUBSURFACE USE
Filed Aug. 21, 1962    2 Sheets-Sheet 1
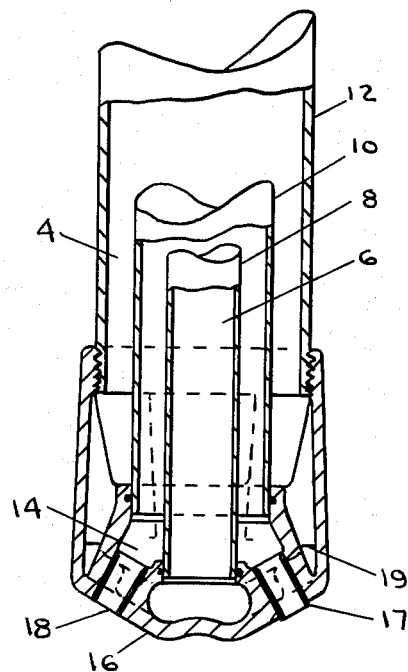
FIG I
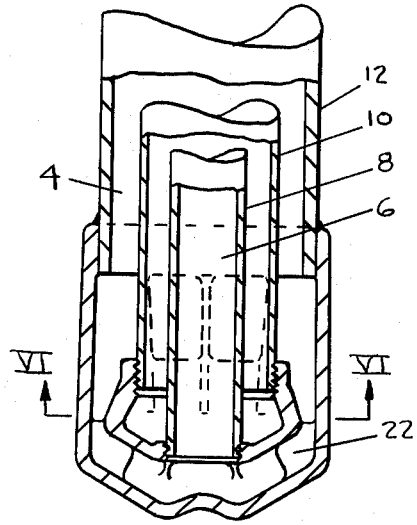
FIG IV
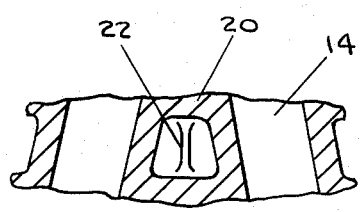
FIG III
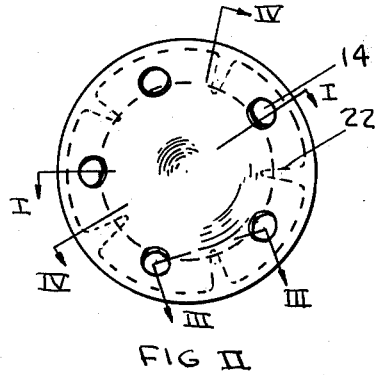
FIG II
*INVENTOR.*
WALTER V. BERRY
BY
ATTORNEY Aug. 17, 1965                    W. V. BERRY                    3,201,104
                        OXYGEN LANCE FOR SUBSURFACE USE
Filed Aug. 21, 1962                                          2 Sheets-Sheet 2
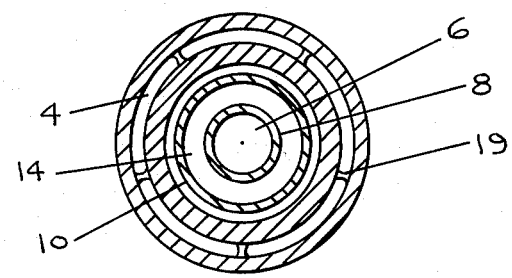
FIG. VI
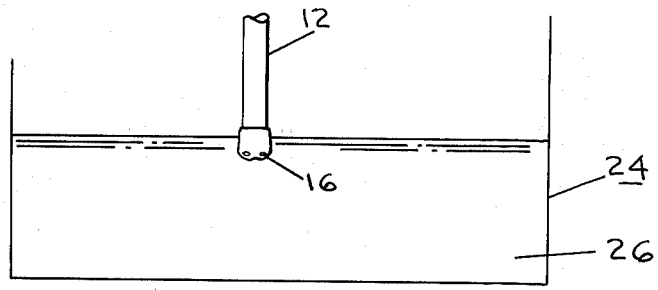
FIG V
*INVENTOR.*
WALTER V. BERRY
BY
ATTORNEY 3,201,104
OXYGEN LANCE FOR SUBSURFACE USE
Walter V. Berry, 2679 Santa Barbara Drive,
Bethel Park, Pa.
Filed Aug. 21, 1962, Ser. No. 218,359
6 Claims. (Cl. 266—34)

My invention relates to gas injection apparatus and more particularly to a lance and nozzle for injecting oxygen directly into and below the surface of the melt in an open hearth furnace.

In accordance with the prior art of which I am aware, it has been the practice to inject quantities of pure oxygen into an open hearth furnace above the melt or bath, in a high velocity stream so that it tends to penetrate the melt for oxidizing the excess carbon, phosphorus, sulfur and other impurities which are mixed in with the molten iron. Due to the very high temperatures inside an open hearth furnace it has been difficult to find or build a lance which would have a substantial lifetime. Attempts have been made to lengthen the life of the lance by providing for various means of water cooling the lance and the nose of the lance. However, in spite of water cooling I have found that with devices of the prior art, deterioration particularly around the oxygen outlet ports due to oxidation of the metal of the nozzle and deterioration of the side walls of the nozzle and the lance has continued to be a problem.

In spite of the problems of the prior art of protecting a lance which is operated above the melt, the present invention provides a lance which may be actually thrust down into the molten metal and operated with the nozzle below the surface of the melt.

I have found that one of the major problems in producing efficient cooling is to provide a smooth and non-turbulent flow of cooling water along the inside surface of the nozzle shell. Water passing through the restricted passageways between the oxygen tubes sweeps clean along the surface of the shell. However, after passing through the passageways between the oxygen tubes, the water enters a larger volume region and has to change direction to move up the lance. Thus the water develops a turbulence which tends to lessen its effectiveness at producing a clean sweeping action under these conditions. However, I have conceived the idea that by providing deflector fins attached to the outside wall of the nozzle opposite the center of the apertures between the oxygen conduits, I can improve the cooling effect of the water. Thus the water stream flows through the said apertures and is separated by the deflectors so that it flows in a smooth manner along the surface of the nozzle shell and around the oxygen conduits and then up the lance thereby producing a better scrubbing action and a better cooling effect on the nozzle shell and on the oxygen conduits in the region of their apertures at the face of the nozzle.

It is therefore an object of my invention to provide means for discouraging oxidation around the oxygen exit ports of an oxygen injector lance.

It is an ancillary object of my invention to provide means for attaching the nozzle of a lance to the shank in such a manner that oxygen resistant inserts may be inserted into the oxygen ports before assembly.

It is another object of my invention to provide an improved method of operation of an oxygen gas lance whereby deterioration of the shank is reduced.

In accordance with an ancillary object of my invention, I provide a novel and useful oxygen injection lance.

In accordance with my invention, I provide an oxygen injection lance comprising three concentric tubes which form passageways therebetween for transportation of oxygen and circulation of cooling water. These three concentric pipes comprise the long shank of the lance and are connected at their extremities to the lance nozzle or nose. The nozzle of the lance comprises a single casting of high conductivity copper, however, for ease of understanding of this description, it will be better if one thinks of the nozzle as comprising a large bulbous exterior piece or shell with a plurality of copper tubes running from points in its cross-sectional interior and somewhat distant from its face, and extending inside the shell in a direction of 15° to 30° from the axis of the nozzle and out through widely separated openings in the nozzle face. These last tubes carry the oxygen out through the face of the nozzle and are surrounded within the bulbous exterior shell with a liquid coolant, usually water.

The three concentric pipes which comprise the shank of the shaft are fastened to the nozzle by being screwed into the nozzle by threaded connections on the nozzle and on the ends of the concentric pipes or welded onto the ends of the concentric pipes. Water is introduced into the center pipe, flows through the nozzle between the oxygen conduits or tubes and back up through the region between the outer and intermediate concentric pipes. Oxygen is supplied to the region between the center pipe and intermediate pipe, flows down to the nozzle, flows into the tubes of the nozzle and through the tubes of the nozzle out into the furnace at the high velocity.

The nozzle is so built that by its bulbous shape, the apertures are widely separated so as to provide separated areas of activity within the furnace melt.

Each of the oxygen tubes leading through and out of the nozzle is shaped internally in the form of a truncated cone so that the exit ports at the face of the nozzle are smaller in cross-sectional diameter than the ports where the oxygen enters these tubes. This construction has two advantages. First, this provides for retaining hollow truncated cone-shaped sleeves of oxidation resistant material such as a ceramic which is inserted into each of the oxygen output tubes. Since the tubes and the sleeves are shaped as truncated cones, having the same slope, the ceramic sleeve will automatically adjust itself to the right position for a snug fit in the oxygen output tube. In accordance with one embodiment of my invention, the ceramic sleeves are built so that a portion of each of them, preferably about ⅛ inch, will extend out beyond the face of the lance.

The oxygen tubes in the nozzle extend outward at an angle rather than being parallel to the axis of the lance. Therefore, in order to get the ceramic inserts into the nozzle tube, I have provided that the junction between the center pipe of the shank and the nozzle is well forward toward the face of the nozzle so that, substantially, the junction between the center pipe and the nozzle is even with but laterally displaced from the entrance to the oxygen tubes of the nozzle. Thus, when the center pipe is withdrawn, the ceramic sleeves may be dropped into the oxygen tubes of the nozzle and they will automatically seek their proper position.

The ceramic sleeves protect the sides of the oxygen tubes from heat and oxygen. Since the ceramic tubes are shaped in the form of a truncated cone and extend out beyond the face of the nozzle, they tend to protect the nozzle from being struck by oxygen.

Secondly, I have found that the oxygen coming out of the tube, although it is traveling at high velocity, nevertheless along the edges it tends to whirlpool after leaving the tubes and curl backward against the face of the lance near the oxygen apertures. However, I have found that by using tubes shaped as described herein, whereby the internal cross-sectional diameter of the oxygen tubes continues to reduce toward the face of the nozzle, the directions of the gas molecules is better controlled so that they do not tend to whirlpool after leaving the nozzle, but instead tend to continue straight forward into the melt.

I have found that with a nozzle of this construction, I may insert the nozzle directly into the melt without unreasonable deterioration of the nozzle. When the nozzle is inserted directly into the surface of the melt, the sides of the nozzle and the shank become covered with slag and other materials from the furnace in a thick coating which in turn protects the lance from deterioration. The lance may also be operated at a position where the nose is above the surface of the furnace bath if the operator so desires.

The following is a detailed description of my invention from which the reader may more clearly gain an understanding of the principles involved, in which:

FIGURE I is a showing in cross-section of a portion of a lance and a nozzle in accordance with my invention.

FIGURE II is a schematic plan view in cross-section of the nozzle of a lance in accordance with my invention showing the relative locations of the water deflectors and the oxygen tubes in the nozzle.

FIGURE III is a cutaway showing in section taken along the line III—III of FIGURE II of a view through one of the ports for water flow between adjacent oxygen conduits in a nozzle in accordance with my invention whereby the water deflector can be seen as it would appear to the stream of water going through between the conduits.

FIGURE IV is a showing in section of a lance in accordance with my invention taken along the line IV—IV of FIGURE II wherein welded and threaded joints are used between the shank and the nozzle.

FIGURE V is a schematic showing in elevation of a lance in a furnace in accordance with the process of one embodiment of my invention.

FIGURE VI is a showing in cross-section of apparatus in accordance with my invention taken along the line VI—VI of FIGURE IV.

In accordance with the preferred embodiment of my invention, I provide an oxygen injection lance 12 for injection of oxygen into an open hearth furnace 24 whereby the lance extends through the roof of the furnace and down to and below the surface of the melt. This lance comprises a shank and nozzle. The shank comprises three concentric pipes 8, 10, 12 which are attached at their extremities in a rigid junction to the nozzle. Preferably, the inner two pipes of the shank are provided with thread which engage threads of the corresponding portions of the nozzle so that the pipes of the shank may be individually screwed into the nozzle.

The nozzle comprises a single casting comprising an outer shell 16 having an inwardly extending dimple in the center of its end and having open areas for the flow of cooling water therein and passageways or conduits 14 for carrying oxygen from the region of the shank out into the furnace. These oxygen passageways can best be thought of as tubes extending from the junction with the pipes of the shank to the face of the nozzle. Since the nozzle is bulbous in shape, the passageways or oxygen tubes 14 extend in a diverging direction toward the face 16 of the nozzle. Thus, there is formed effectively a tunnel region area between each pair of adjacent oxygen tubes and the face of the nozzle. In accordance with my invention, the roof portion of this tunnel region comprises a metallic filler 20 which forms part of the walls of adjacent conduits. This tunnel area is contiguous with the inside of the face 16 of the nozzle and is open for the flow of water from the center of the nozzle along the face of the nozzle.

As a stream of water flows through the area between two adjacent oxygen tubes 14, it then has a tendency to flow directly up along the inside of the outer nozzle wall and up along the inner surface of the exterior pipe 12 of the three concentric pipes 8, 10, 12 of the shank. However, I have found that most of the deterioration of the nozzle occurs in the immediate region next to the oxygen ports. It is therefore desirable to keep the region around the junction between the face of the nozzle and the oxygen tubes as cool as possible. I have therefore realized that if radially aligned substantially flat deflectors 22 were attached to the outside wall of the nozzle opposite the holes between adjacent tubes, and perpendicular to the outside wall and face of the nozzle, and extend inward into the region between adjacent tubes, they would tend to deflect the water around the tubes after it passes through between the tubes and before it passes back up the shank of the lance. Also, these deflector vanes 22 will provide increased heat conduction away from the face of the lance.

The oxygen passageways or tubes 14 inside the nozzle are formed in the shape of truncated cones, the cross-sectional areas of which grow smaller toward the face of the nozzle. The angle of slope of the walls of the oxygen passageways is preferably three degrees from the central axis of the oxygen conduit.

Inside the oxygen conduits of the nozzle, I provide hollow cylindrical tapered sleeves which are tapered to match the taper of the passageway so that there is a snug fit between the sleeve and the walls of the passageway. These sleeves 18 are designed and constructed of ceramic material or similar oxidation and heat resistant material and extend through the passageway, and, in accordance with one embodiment of my invention, a short distance, preferably 1/8", beyond the face of the nozzle. The ceramic sleeves are approximately 1/8" in thickness, or less, so as not to appreciably reduce the oxygen flow capacity of the oxygen conduits in the nozzle.

By being slightly tapered, the sleeves produce several advantageous effects. First, by this arrangement the ceramic sleeves do not need to be fastened to the nozzle but instead may merely be dropped into place and will stay in place by their own weight, the force of the oxygen on them, the friction between them and the walls, and to some extent by the difference in contraction with changes in temperature of the metal of the lance and the material of the sleeves.

Secondly, if the sleeves are slightly tapered inward on their interior, they tend to prevent a whirlpool or aspiration effect by the gases after leaving the lance. Thus, the gases leaving the lance do not have a tendency at the edges of the stream to circle back around and strike the face of the lance near the oxygen conduit apertures.

Since the ceramic sleeves must be dropped into place in the passageways from inside the lance, it is necessary that the lance be so designed that there will be nothing in the way which would prevent their insertion. I therefore provide that the center pipe of the three concentric pipes of the lance shank be fastened to the nozzle casting close to the face of the nozzle at a point approximately even with the entrance to the oxygen passageways. Thus, when the center pipe of the shank is removed, free access may be obtained to the oxygen passageways in the nozzle for insertion of the ceramic sleeves.

In assembling the lance, the nozzle is first cast, the passageways are reamed, and the ceramic sleeves are inserted. The nozzle is then complete. After the nozzle is complete, the inner pipe of the shank is screwed into place, then the intermediate pipe of the shank is screwed into place in the nozzle, and then the outer pipe of the shank is welded into place. By using this procedure, a workman can work unencumbered and can easily see what he is doing as he assembles the lance.

On the inside of the outer sidewall of the nozzle I provide inward extending, generally triangular, radial cooling fins 19. These fins 19 are located in the regions between the walls of the oxygen outlet tubes 14 and the outside wall of the nozzle and extend from the face of the nozzle, upward in a taper toward the outside wall of the nozzle so as to end at a point near where said outer pipe 12 joins the outside wall of the nozzle. The cooling fins 19 are in contact with the water and serve to conduct heat from the outer shell of the nozzle so as to protect the shell and, incidentally, they also add structural strength to the nozzle.

In the operation of this device, water is fed into the center pipe, flows down into the nozzle against the face of the nozzle, which was a slight dimple at the center thereof to cause a deflection outward of the water. The water then flows through the aperture between adjacent oxygen tubes in a confined area against the face of the nozzle so that it scrubs steam bubbles and solid debris away from the surface of the nozzle face. The water then encounters the deflectors and is deflected so as to have a component of velocity parallel to the sides of the nozzle, and then flows up along the sides of the nozzle, past the cooling fins and up along the inside of the outer pipe of the shank. While it appeared to me at first that it was desirable to have the water completely surround the oxygen conduits near their regions of contact with the face of the shell, nevertheless I have found that this is not practical. Too much turbulence is provided in the water flow. I have therefore found that by the use of cooling fins as described I obtain a much better result. The cooling fins cooperate with the walls of the oxygen tubes and the shell of the nozzle to separate the streams of water passing through between adjacent pairs of oxygen conduits. Thus, whereas adjacent streams of water would otherwise have a tendency to flow around behind an oxygen tube near the face of the shell and encounter each other so as to create a condition of turbulence, on the other hand, in my construction, the cooling fins separate adjacent streams of water and prevent their interaction and the resulting turbulence. The water thus flows around each side of the oxygen conduits, is directed toward the cooling fins and is then directed upward by the cooling fins in a smooth controlled manner with a minimum of turbulence toward the passageway 4 between the outer pipe 12 and the intermediate pipe 10. This controlled flow of cooling water is effective in producing a greatly improved cooling effect, particularly in the region of the face of the nozzle.

Oxygen is fed into the region between the center pipe of the shank and the intermediate pipe of the shank, flows down through the oxygen passageways which are lined with the ceramic sleeves, flows out through the ceramic sleeves, which are tapered so as to produce a nozzle effect, and out into the furnace with substantially no backlash or aspiration effect of the oxygen toward the face of the nozzle.

In the operation of this lance, the lance has been inserted through the roof of the open hearth furnace, with water circulating therein, and with oxygen under pressure passing therethrough and out through the oxygen passageways. The nozzle and lance are lowered until the nozzle face is below the surface of the material in the furnace which is usually referred to as the "melt" or the "bath," for a distance of from a few inches to a foot beneath the surface of the bath. As the nozzle is inserted into the bath, slag and other materials on the surface of the bath will cling to the sides of the lance and nozzle, thereby forming an additional protective coating for the lance and the nozzle. Since the face of the nozzle constructed in accordance with this invention is so well protected by cooling from inside and by the ceramic inserts in the oxygen passageways and the flow of the oxygen, the face of the nozzle does not have to be covered with a coating of slag and similar materials for protection. This is fortunate because I have found that generally the slag will not cling to the face of the nozzle to any great degree.

I have thus conceived a practical and highly deterioration-resistant lance and method of operation thereof for injecting pure oxygen into an open hearth furnace so as to burn out the excess carbon in the melt much more quickly than was possible with prior systems, thereby decreasing the melt to melt time and thereby increasing the productivity of an open hearth furnace.

In accordance with one embodiment of my invention, the deflector vanes 22 are sloped at an angle to the radii of the nozzle at least on one side so that they impart a greater circumferential component of velocity to the water and thereby provide a greater scrubbing action along the outer side of the oxygen tubes inside the shell.

Since the conduits are shorter than those of the prior art and their axes extend at an angle of 30° to the axis of the shank they have a greater tendency to separate the streams of oxygen and in turn to separate the reaction areas of the streams of oxygen and the molten bath.

Although I have shown and described specific embodiments of my invention, I am aware that other modifications thereof are possible; my invention, therefore, is not to be restricted except insofar as is necessitated by the prior art and the spirit of the invention.

I claim as my invention:

1. A lance for supplying oxygen to a molten metal, comprising a shank and a nozzle, said nozzle comprising a hollow bulbous shell having an open end and an opposite solid end and having a plurality of tubes extending through said solid end; said shank comprising three concentric pipes extending into the open end of said nozzle and being fixedly but removably attached therein; said tubes extending through said solid end of said nozzle and interconnecting at the region between the innermost of said pipes and its circumjacent pipe in the interior of said shell for conducting oxygen from said shank out through said nozzle, said tubes being slightly tapered inside so that the interior cross-sectional area diminishes slightly toward said face of said nozzle, hollow cylindrical inserts of an oxidation resistant material located in each of said tubes and having an angle of taper matching the angle of taper of said tubes, water deflecting vanes located opposite a point midway between adjacent tubes so as to deflect water passing through between a pair of said tubes from the center of said nozzle to the inner side of said nozzle shell, the junction between the inner concentric pipe and said nozzle being located so that when said inner pipe is removed, said inserts can be inserted into their respective tubes.

2. A lance for supplying oxygen to molten metal comprising a nozzle and a shank; said nozzle comprising a hollow bulbous piece of metal casing having a solid end and an open end and having a plurality of tubes extending through said solid end; said shank comprising three concentric pipes extending into the open end of said nozzle and being fixedly but removably attached therein; said tubes extending through said solid end of said nozzle and interconnecting the region between the innermost of said pipes and its circumjacent pipe in the interior of said nozzle for conducting oxygen from said shank out through said nozzle, said conduits being tapered at least three (3) degrees inside so that the interior cross sectional area diminishes slightly toward said face of said nozzle, hollow cylindrical inserts of an oxidation resistant material located in each of said conduits and having their outside angle of taper matching the inside angle of taper of said conduits, water deflecting vanes located attached to the outer wall of said bulbous piece and opposite a point midway between said conduits so as to deflect water, passing through between a pair of said oxygen conduits from the center of the nozzle to the outer regions of said nozzle, toward a direction parallel to the surface of said nozzle wall, the junction between the inner concentric pipe and said nozzle being located so that when said inner pipe is removed, said inserts can be inserted into their respective conduits.

3. An oxygen lance for use with an open hearth furnace, comprising a nozzle and a shank, said nozzle comprising a hollow bulbous piece of metal casing having a solid end and an opposite open end and having a plurality of tubes extending through said solid end; said shank comprising three concentric pipes extending into the open end of said nozzle and being fixedly but removably attached therein; said tubes extending through said solid end of said nozzle and interconnecting the region between the innermost of said pipes and its circumjacent pipe in the interior of said nozzle for conducting oxygen from said shank out through said nozzle, said conduits being tapered at least three (3) degrees inside so that the interior cross sectional area diminishes slightly toward said face of said nozzle, hollow cylindrical inserts of an oxidation resistant material located in each of said conduits and having an external angle of taper matching the internal angle of taper of said conduits, water deflecting vanes attached to the outer wall of said bulbous piece and located opposite a point midway between said conduits so as to deflect water passing through between a pair of said oxygen conduits from the center of the nozzle to the outer regions of said nozzle toward a direction parallel to the surface of said nozzle wall, the junction between the inner concentric pipe and said nozzle being located so that when said inner pipe is removed, said inserts can be inserted into their respective conduits.

4. A lance for supplying oxygen to a molten metal, comprising a nozzle and a shank; said nozzle comprising a hollow shell with a solid end and an opposite open end and having a plurality of tubes extending through said solid end; said shank comprising three concentric pipes extending into said open end of said nozzle and being fixedly but removably attached therein; said tubes extending through said solid end of said nozzle and interconnecting the region between the innermost of said pipes and its circumjacent pipe in the interior of said nozzle for conducting oxygen from said shank out through said nozzle into said furnace, said tubes being slightly tapered inside so that the interior cross sectional area diminishes slightly toward said face of said nozzle, hollow cylindrical inserts of an oxidation resistant material located in each of said tubes and having an exterior angle of taper matching the interior angle of taper of said tubes, water deflecting vanes located opposite points midway between adjacent tubes so as to deflect water, passing through between a pair of said tubes from the center of the nozzle to the outer regions of said nozzle, toward a direction parallel to the surface of said nozzle wall.

5. An oxygen lance comprising a shank and a nozzle, said nozzle comprising a hollow bulbous outer metal shell having an open end and an opposite solid end and having a plurality of tubes extending through said solid end; said shank comprising three concentric pipes extending into said open end of said nozzle and being fixedly but removably attached therein; said tubes extending through said solid end of said nozzle and interconnecting the region between the innermost of said pipes and its circumjacent pipe in the interior of said nozzle for conducting oxygen from said shank out through said nozzle, said tubes being widely separated so that the center outlet ports of said tubes are at least two and one-half inches from the axis of said lance, hollow cylindrical inserts of an oxidation resistant material located in each of said tubes, water deflecting vanes attached to said shell opposite a point midway between adjacent tubes so as to deflect water, passing through between a pair of said tubes from the center of the nozzle to the outer regions of said nozzle, toward a direction parallel to the surface of said nozzle wall, the junction between the inner concentric pipe and said nozzle being located so that when said inner pipe is removed, said inserts can be inserted into their respective tubes.

6. An oxygen lance comprising a shank and a nozzle, said nozzle comprising a hollow tubular metal casing with an open end and an opposite solid end and having a plurality of tubes extending through said solid end; said shank comprising three concentric pipes extending into the open end of said nozzle and being fixedly but removably attached therein; said tubes extending through said solid end of said nozzle and interconnecting the region between the innermost of said pipes and its circumjacent pipe in the interior of said nozzle for conducting oxygen from said shank out through said nozzle, said tubes being slightly tapered inside so that the interior cross sectional area diminishes slightly toward said face of said nozzle, hollow cylindrical inserts of an oxidation resistant material located in each of said tubes and having an external angle of taper matching the internal angle of taper of said tubes.

References Cited by the Examiner

UNITED STATES PATENTS

| | | | |
|---|---|---|---|
| 1,849,814 | 3/32 | Woodruff | 158—73 |
| 2,145,649 | 1/39 | Fox | 158—73 X |
| 2,454,892 | 11/48 | Sprow | 266—41 |
| 2,514,777 | 7/50 | Marra | 158—27.4 |
| 2,836,411 | 5/58 | Auer | 266—34 |
| 2,863,656 | 12/58 | Cox | 266—41 |
| 2,878,115 | 3/59 | Schane et al. | 266—41 X |
| 2,952,903 | 9/60 | Washken et al. | 106—58 |
| 2,979,270 | 4/61 | Hutton. | |
| 3,020,035 | 2/62 | Hinds et al. | 266—34 |

FOREIGN PATENTS 222,679  7/59  Australia.

MORRIS O. WOLK, *Primary Examiner.*

WINSTON A. DOUGLAS, JAMES H. TAYMAN, JR.,
*Examiners.*